US005081476A

United States Patent [19]

Genovese

[11] Patent Number: 5,081,476

[45] Date of Patent: Jan. 14, 1992

[54] IONOGRAPHIC PRINTHEAD GATING CONTROL FOR CONTROLLING CHARGE DENSITY IMAGE DEFECTS DUE TO SURFACE VELOCITY VARIATIONS

[75] Inventor: Frank C. Genovese, Fairport, N.Y.

[73] Assignee: Xerox Corporation, Stamford, Conn.

[21] Appl. No.: 504,216

[22] Filed: Apr. 4, 1990

[51] Int. Cl.[5] ............ G01D 15/06

[52] U.S. Cl. ............ 346/159; 346/107 A

[58] Field of Search ............ 346/155, 158, 159, 107 A, 346/1.1; 355/214, 221; 250/325; 358/412, 486

[56] References Cited

U.S. PATENT DOCUMENTS

| | | | |
|---|---|---|---|
| 3,815,145 | 6/1974 | Tisch et al. | 346/74 EB |
| 3,912,989 | 10/1975 | Watanabe et al. | 250/325 X |
| 3,958,251 | 5/1976 | Borelli | 346/74 EE |
| 4,287,524 | 9/1981 | Ohnishi et al. | 346/154 |
| 4,435,066 | 3/1984 | Tarumi et al. | 355/3 SC |
| 4,435,723 | 3/1984 | Semiya et al. | 346/154 |
| 4,463,363 | 7/1984 | Gundlach et al. | 346/159 |
| 4,494,129 | 1/1985 | Gretchev | 346/154 |
| 4,504,130 | 3/1985 | Bell et al. | 346/107 A X |
| 4,524,371 | 6/1985 | Sheridon et al. | 346/159 |
| 4,538,163 | 8/1985 | Sheridon | 346/155 |
| 4,569,583 | 2/1986 | Robson et al. | 355/14 CH |
| 4,575,739 | 3/1986 | De Schamphelaere | 346/160 |
| 4,644,373 | 2/1987 | Sheridan | 346/159 |
| 4,695,723 | 9/1987 | Minor | 250/325 |
| 4,737,805 | 4/1988 | Weisfield et al. | 346/159 |
| 4,804,980 | 2/1989 | Snelling | 346/159 |
| 4,814,834 | 3/1989 | Endo et al. | 355/214 X |
| 4,837,636 | 6/1989 | Daniele et al. | 358/300 |
| 4,839,671 | 6/1989 | Theodoulou et al. | 346/159 |
| 4,972,212 | 11/1990 | Hauser et al. | 346/159 |
| 4,973,994 | 11/1990 | Schneider | 346/159 |
| 4,996,425 | 2/1991 | Hauser et al. | 250/325 |

*Primary Examiner*—Benjamin R. Fuller
*Assistant Examiner*—Randy W. Gibson
*Attorney, Agent, or Firm*—Mark Costello

[57] ABSTRACT

In an ionographic device having a printhead, including a source of ions, a modulation channel defining a path for a stream of ions from the the ion source towards a moving imaging surface, an array of modulation electrodes arranged along the path to modulate the stream of ions in imagewise fashion, a gating electrode is provided at a location adjacent to the path of ion stream, biased to create a field to block or allow passage of the ion stream in accordance with movement of the imaging surface, the biasing arrangement allowing passage of ions for a maximum period over which ions for a line of the image are deposited on the moving imaging surface. The bias on the electrode is controlled in accordance with movement of the imaging surface, as detected by a motion detecting encoder, and in accordance with a predetermined period to produce a constant charge density on the imaging surface at the writing position.

5 Claims, 4 Drawing Sheets

IONOGRAPHIC PRINTHEAD GATING CONTROL FOR CONTROLLING CHARGE DENSITY IMAGE DEFECTS DUE TO SURFACE VELOCITY VARIATIONS

CROSS REFERENCE

Cross reference is made to U.S. Pat. No. 4,996,425 to Hauser et. at.; U.S. Pat. No. 4,972,212 to Hauser et. al.; and U.S. Pat. No. 4,973,994 to Schneider; all of which are assigned to the same assignee as the present application.

The present invention relates generally to controlling ion charge density deposition in ionographic devices, and more particularly to controlling ion charge density deposition with a gating field controlled in accordance with movement of the imaging surface.

INCORPORATION BY REFERENCE

U.S. Pat. Nos. 4,524,371 to Sheridon et. al., 4,463,363 to Gundlach et. al., 4,538,163 to Sheridon, 4,644,373 to Sheridan et. al., 4,737,805 to Weisfield et. al. are incorporated by reference for their teachings regarding ionographic head construction, modulation circuitry, and ionographic device architecture.

BACKGROUND OF THE INVENTION

In ionographic devices such as that described by U.S. Pat. Nos. 4,524,371 to Sheridon et. al. or 4,463,363 to Gundlach et. al., an ion producing device generates ions to be directed past a plurality of modulation electrodes to an imaging surface or electroreceptor in imagewise configuration. In one class of ionographic devices, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on a charge retentive surface in imagewise configuration to form an electrostatic latent image developable by electrostatographic techniques for subsequent transfer to a final substrate. The arrangement produces a high resolution non-contact printing system. Other ionographic devices are known which operate similarly, but do not rely on a moving fluid stream to carry ions to a surface.

The generation of high quality images requires uniform electroreceptor motion past the writing head to prevent banding due to unwanted fluctuations in optical density or other motion related defects in the image. These defects have been reduced in related printing arts by synchronizing data flow to surface motion. Commonly, an encoder or an equivalent device is used to incrementally measure surface motion and initiate writing when the surface has advanced by one print line width. Since the writing process is linked to surface motion, each line in the image is correctly placed on the surface in spite of velocity variations.

However, in ionographic printing, although each line of the image may be correctly located on the electroreceptor surface in accordance with the above encoding arrangement, so that no banding occurs because of line spacing variations, fluctuations in local charge density occur due to differences in dwell time of the printhead at each line. The dwell time varies because the time between encoder pulses varies with surface velocity. With varying length of the writing period, charge is deposited on the electroreceptor in varying amounts, which ultimately develop as darker and lighter lines, in a non-uniform manner.

U.S. Pat. No. 4,839,671 to Theodoulou et. al. teaches control of print density or resolution (number of dots per inch) by providing a set of control electrodes individually driven by a clocked driver element, wherein the clocking signals are synthesized based on desired resolution. U.S. Pat. No. 4,575,739 to De Schamphelaere et. al. shows a motion-based control system for modulating a set of illuminating discharge devices in an electrophotographic printer in accordance with motion of the photoreceptor, based on the desired optical density level of the image. U.S. Pat. No. 4,494,129 to Gretchev shows an ionographic printer where gated oscillators apply a high voltage alternating current to drive electrodes and a counter provided for controlling the gated oscillator. U.S. Pat. No. 4,435,723 to Seimiya shows a recording apparatus where derived image signals are switched for blocking or allowing passage of image signals when predetermined image coordinates coincide with detected position to provide an editing or erase function. U.S. Pat. No. 4,435,066 to Tarumi et. al. discloses an ion modulating electrode which increases the strength of the ion flow passing therethrough by strengthening the electric field between the electrode and the charge retentive surface. U.S. Pat. No. 4,287,524 to Ohnishi et. al. shows an electrostatic recording head where the control voltage is delayed after application of the recording voltage to produce a potential difference large enough to prevent a decrease in recording density. U.S. Pat. No. 3,958,251 to Borelli teaches an electrode driving circuit in an electrographic head which maintains the electrodes active when the print medium is moved across it to produce a latent image. U.S. Pat. No. 3,815,145 to Tisch discloses an electrostatic printing system in which the ion stream is controlled by an electrical and mechanical shuttering arrangement. U.S. Pat. No. 4,804,980 to Snelling shows an ionographic printer where modulation of the ion beam directed at a charge retentive surface is accomplished with a laser writing beam writing on a cylindrical photoconductive screen, arranged to bring exposed portions thereof between the ion source and charge retentive surface for the creation of latent image thereon. U.S. patent applications Ser. Nos. 07/370,317, filed 6/22/89, U.S. Pat. No. 4,972,212 by Hauser et. al. and 07/428,714, U.S. Pat. No. 4,973,994 filed 10/30/89 by Schneider, both teach electrodes adjacent the ion stream path and between the modulation electrodes and the imaging surface for control of blooming artifacts, and 07/428,714 filed 10/30/89, U.S. Pat. No. 4,973,994 by Schneider, teaches varying bias on such an electrode. All the patents and patent applications cited are incorporated by reference herein.

SUMMARY OF THE INVENTION

In accordance with the invention, in an ionographic printing system, there is provided a method and apparatus for controlling charge density variations on the imaging surface caused by motion quality defects.

In accordance with one aspect of the invention, in an ionographic device projecting a modulated stream of ions in imagewise fashion towards a moving imaging surface, one or more gating electrodes may be arranged adjacent to the path of the ion stream, biased with a gating voltage signal, to create a field controlling passage of the stream thereby in accordance with movement of the charge retentive surface.

In accordance with another aspect of the invention, in an ionographic printhead, having a source of ions, a modulation channel defining a path for a stream of ions from the ion source towards a moving imaging surface, and array of modulation electrodes arranged along said path to modulate the stream of ions in imagewise fashion, a gating electrode is provided at a location adjacent to the path of the ion stream, biased to create a field to block or allow passage of the ion stream in accordance with movement of the imaging surface, said biasing arrangement allowing passage of ions for a maximum period over which ions for a line of the image are deposited on the moving imaging surface. The bias on the electrode is controlled in accordance with movement of the imaging surface, as detected by a motion detecting encoder, and in accordance with a predetermined period to produce a constant charge density on the imaging surface at the writing position. The gating electrode may be positioned upstream, downstream or over the modulation electrodes.

These and other aspects of the invention will become apparent from the following description used to illustrate a preferred embodiment of the invention read in conjunction with the accompanying drawings in which:

FIG. 1 schematically shows an ionographic printhead of the type contemplated for use with the present invention, in printing relationship with an imaging surface;

Figure 4:
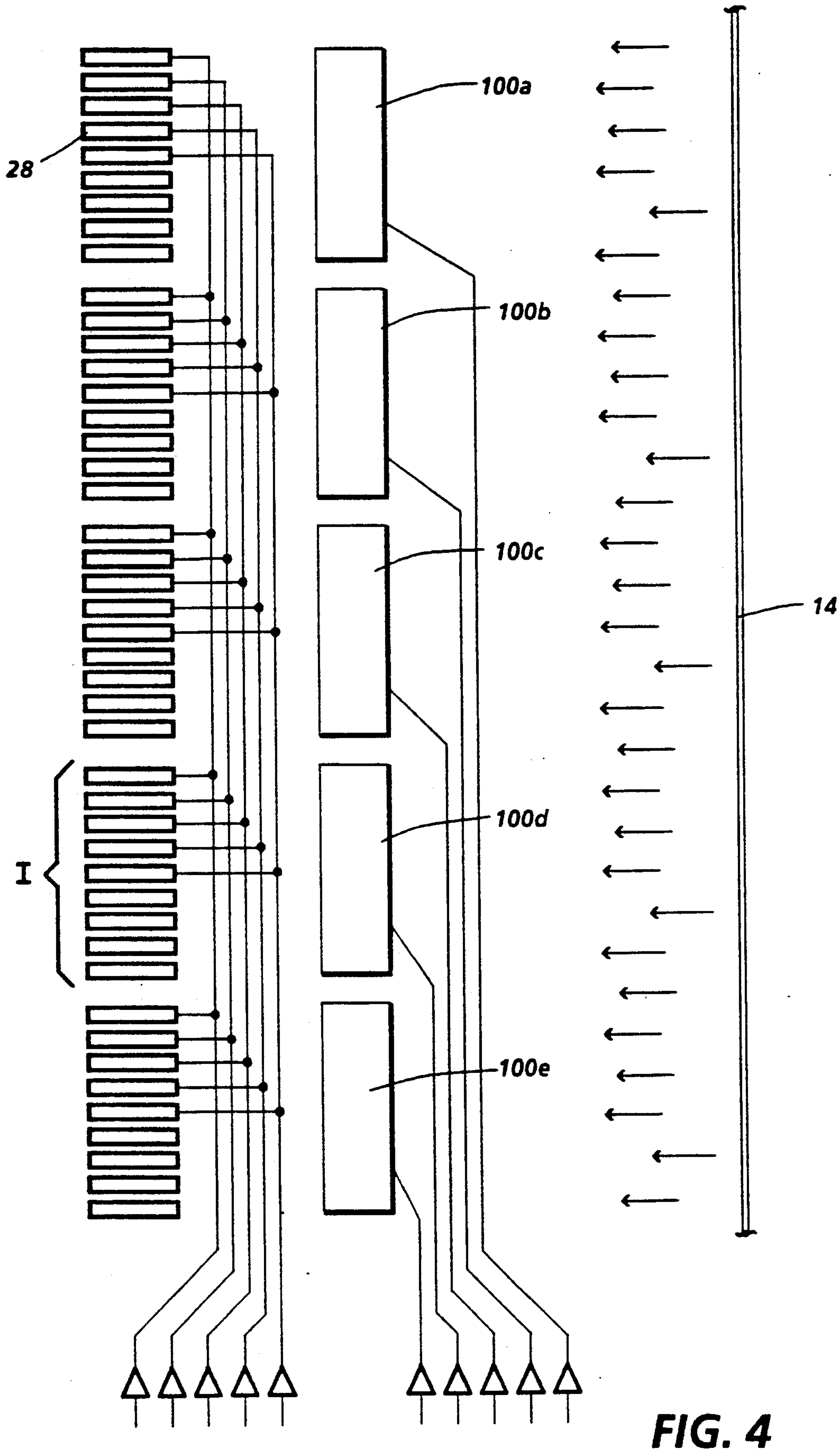
Figure 5A:
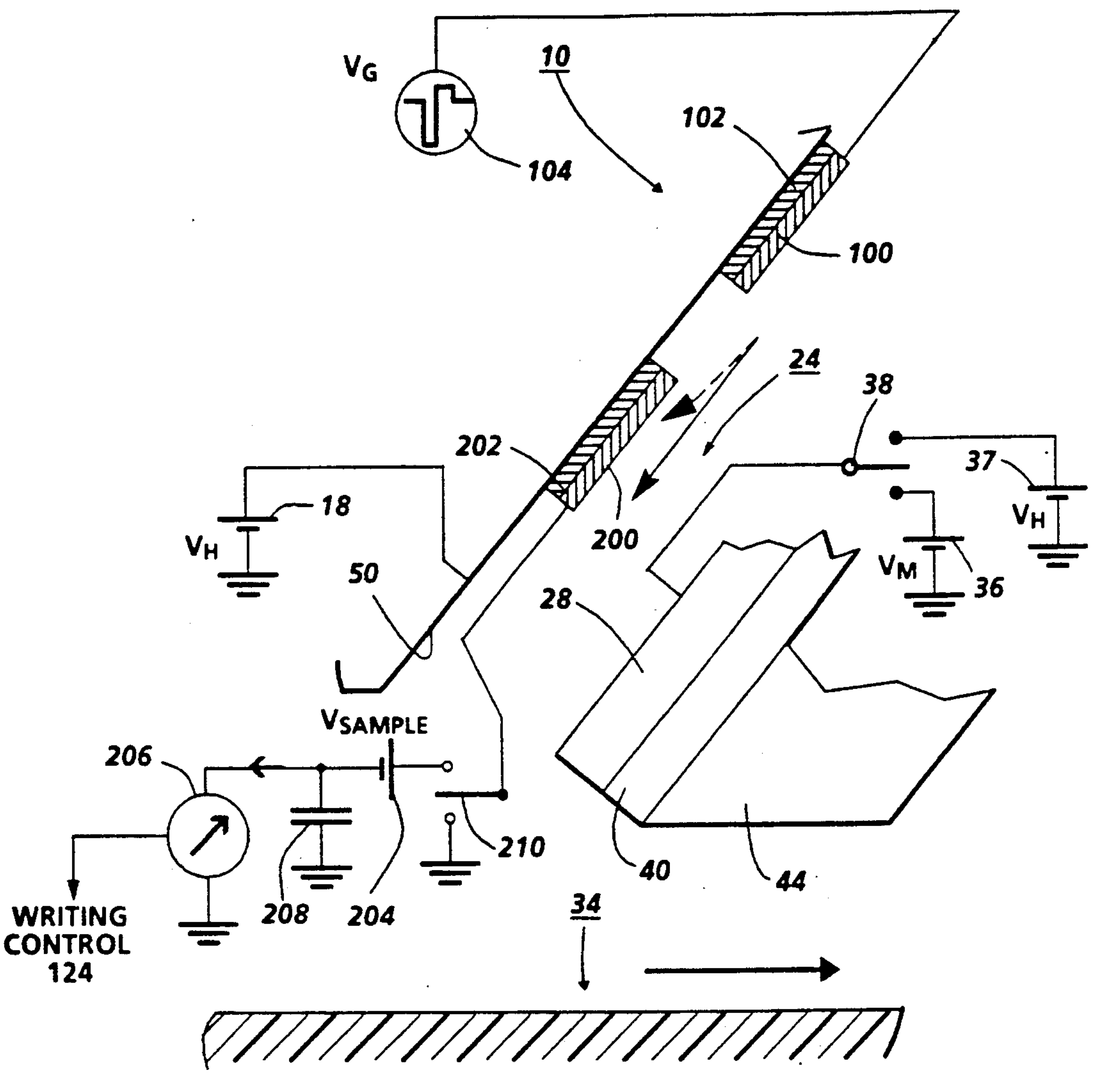
Figure 5B:
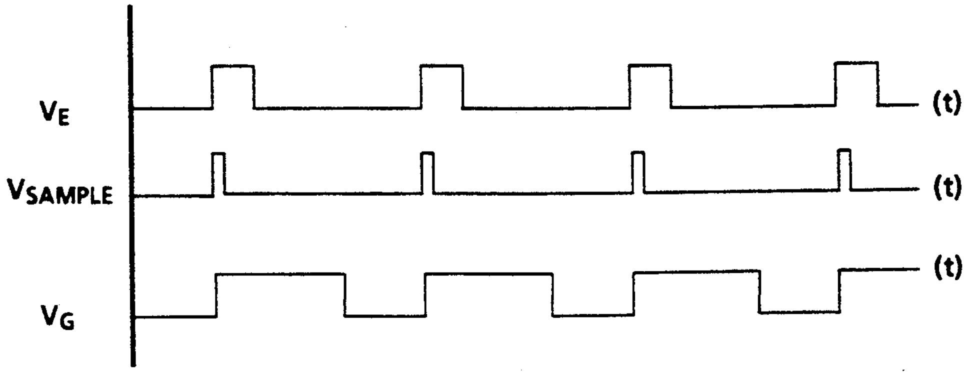

FIG. 4 shows a highly schematic view of the modulation channel incorporating a gating electrode for use in a multiplexing arrangement; and FIGS. 5A and 5B respectively show an ionographic printhead arrangement with a gating electrode and a charge density measuring electrode in the modulation channel, and a graph of appropriate driving voltages illustrating driving of the gating electrode and the current measuring electrode in accordance with a motion detecting encoder arrangement.

Figure 1:
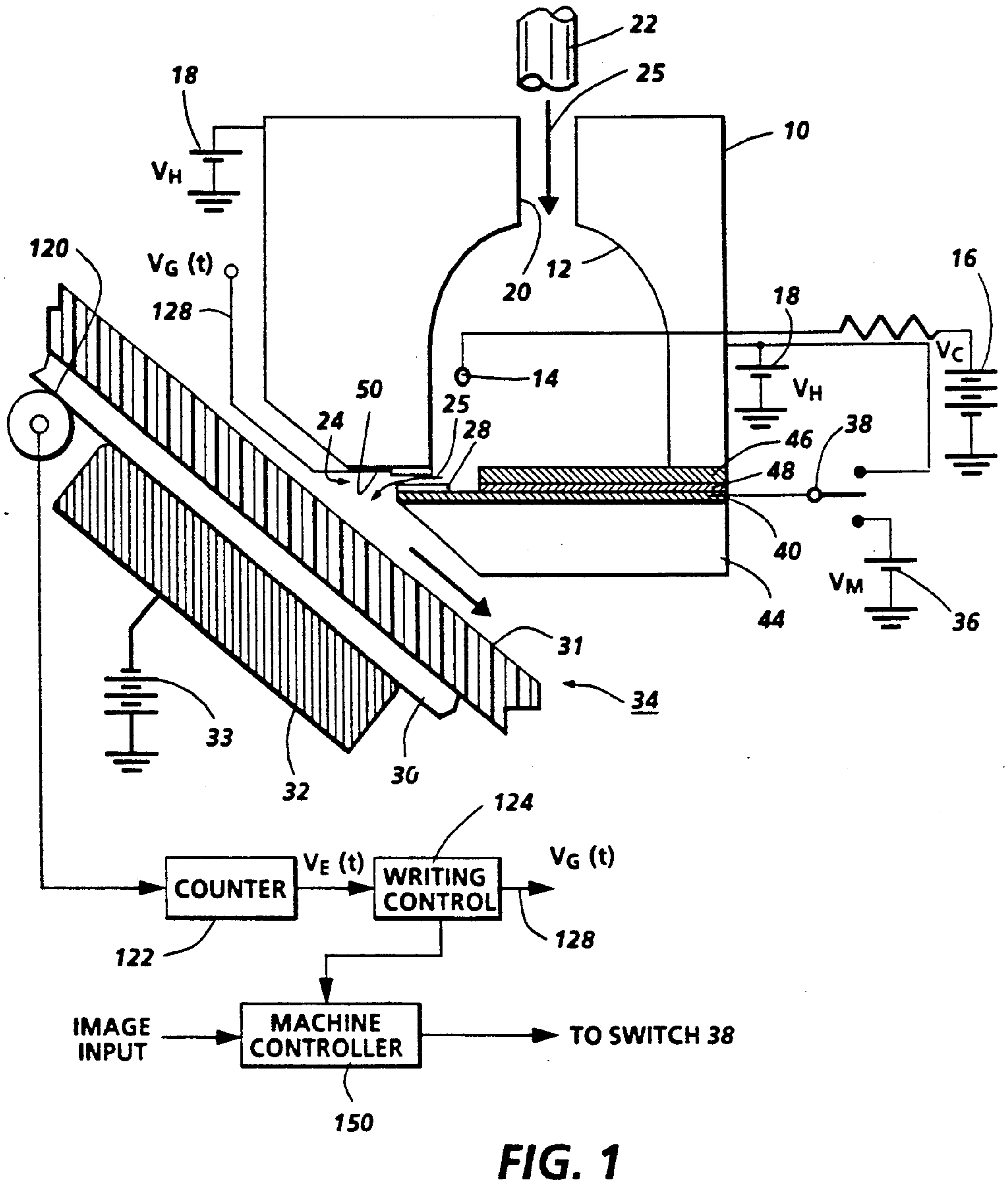

With reference now to the drawings where the showings are for the purpose of illustrating an embodiment of the invention and not for limiting same, FIG. 1 shows a schematic representation of a cross section of the marking head 10 of a fluid jet assisted ionographic marking apparatus similar to that described in commonly assigned U.S. Pat. No. 4,644,373 to Sheridan et. al.

Within head 10 is an ion generation region including an ion chamber 12, a coronode 14 supported within the chamber, a high potential source 16, on the order of several thousand volts D.C., applied to the coronode 14, and a reference potential source 18, connected to the wall of chamber 12, maintaining the head at a voltage $V_H$. The corona discharge around coronode 14 creates a source of ions of a given polarity (preferably positive), which are attracted to the chamber wall held at $V_H$, and fill the chamber with a space charge.

An inlet channel 20 to ion chamber 12 delivers pressurized transport fluid (preferably air) into chamber 12 from a suitable source, schematically illustrated by tube 22. A modulation channel 24 conducts the transport fluid out of the chamber from ion chamber 12 to the exterior of the head 10. As the transport fluid passes through ion chamber 12, it entrains ions and moves them into modulation channel 24, past modulation electrodes 28. The interior of ion chamber 12 may be provided with a coating that is inert to the highly corrosive corona byproducts produced therein. In order to increase ion efficiency at the modulation channel 24, various arrangements providing differential biasing of the interior surface of ion chamber 12 have been proposed.

Ions allowed to pass out of head 10, through modulation channel 24, and directed to charge receptor 34, come under the influence of a conductive plane 30, provided as a backing layer to a charge receptor dielectric surface 31, with conductive plane 30 slidingly connected via a shoe 32 to a voltage supply 33. Alternatively, a single layer dielectric charge receptor might be provided, passing a biased back electrode to the same effect. Subsequently the latent image charge pattern may be made visible by suitable development apparatus (not shown).

Once ions have been swept into modulation channel 24 by the transport fluid, it becomes necessary to render the ion-laden fluid stream intelligible. This is accomplished by individually switching modulation electrodes 28 in modulation channel 24, between a marking voltage source 36 and a reference potential 37 by means of a switch 38. While the switching arrangement shown produces a binary imaging function, grey levels may be provided by providing a continuously variable voltage signal to the modulation electrodes. The modulation electrodes are arranged as a thin film layer 40 supported on a planar insulating substrate 44 between the substrate and a conductive plate 46, and insulated from the conductive plate by an insulating layer 48.

Modulation electrodes 28 and the opposite wall 50, held at $V_H$, comprise a capacitor, across which the voltage potential of source 36, may be applied, when connected through switch 38. Thus, an electric field, extending in a direction transverse to the direction of the transport fluid flow, is selectively established between a given modulation electrode 28 and the opposite wall 50.

"Writing" of a selected spot is accomplished by connecting a modulation electrode to the reference potential source 37, held at $V_H$, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation voltage is applied to an electrode. This is accomplished by connecting the modulation electrode 28 to the low voltage potential of source 36 via switch 38 so as to impose upon the electrode a charge of the same sign as the ionic species. The ion "beam" will be repelled and be driven into contact with the opposite, conductive wall 50 where the ions neutralize into uncharged, or neutral air molecules. Thus, an imagewise pattern of information is formed by selectively controlling each of the modulation electrodes on the marking array so that the ion "beams" associated therewith either exit or are inhibited from exiting the housing, as desired. In the invention as described hereinbelow, and in most applications, it is highly desirable that the ion beam or amount of ions that eventually flow through the modulation channel is approximately constant. This can be accomplished with a corotron control circuit (not shown)

As an alternative to an ionographic printing head with fluid jet assisted ion flow, it will no doubt be appreciated that other ionographic printheads may be provided where the ion stream could be field directed to the charge receptor, or directed to the charge receptor by a highly directionalized ion source. Further, while the description herein assumes positive ions, appropriate changes may be made so that negative ions may be used.

Various electrodes and biasing arrangements therefor, for the improvement of image quality and particularly for the reduction of blooming artifacts, have been proposed for placement adjacent to the ion stream path. These have little or no affect on the present invention, and are accordingly not described herein.

Figure 2:
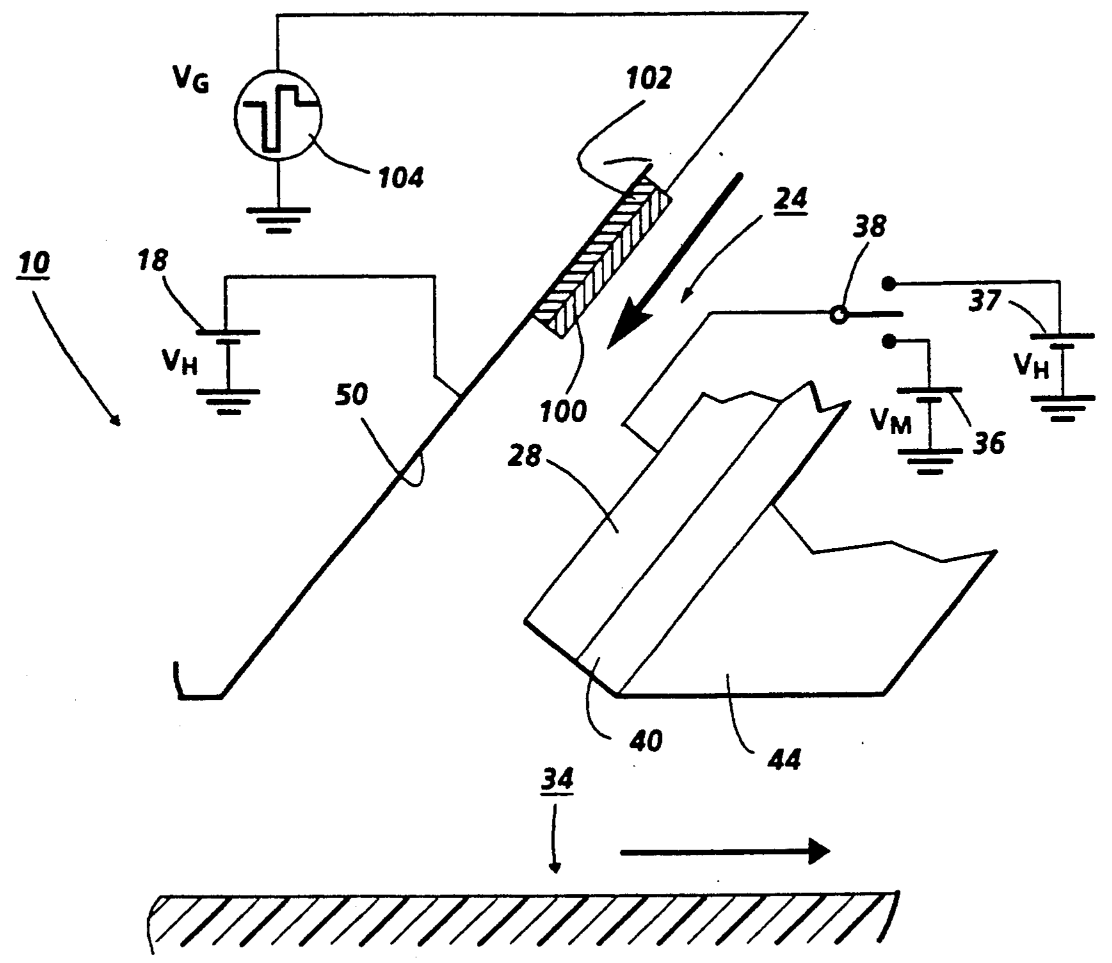
FIG. 2 shows an embodiment of the invention in an ionographic printing head.

In accordance with the invention, and as shown in FIGS. 1 and 2, one or more gating electrodes 100, supported on insulative support 102, on conductive wall 50, are arranged at modulation channel 24, extending in a direction across charge receptor 34, transverse to the direction of ion movement through the modulation channel, and generally transverse to the direction of movement of the charge receptor, to control the passage of the ion stream past the gating electrode 100. FIG. 2 shows a configuration with a conductor as the control electrode 100, with a generally rectangular cross section, having a voltage $V_G$ applied thereto. While one desirable position for the gating electrode 100 is upstream in modulation channel 24 from modulation electrodes 28 on conductive wall 50, a downstream or directly opposite position are also possible. Additionally, the electrode may also be positioned upstream, directly over the modulation electrodes on substrate 44 for convenience in manufacturing and positioning accuracy, insulated therefrom with an insulator structure. In short, the electrode may be positioned anywhere through modulation channel 24 or at its entrance where application of an appropriate potential to the electrode will block passage of the ion stream. Manufacturability of the arrangement will be a limiting factor. The size of the electrode in the direction parallel to ion flow may also be adjusted for effectiveness of the device in blocking ion flow. A larger electrode in this direction will allow the use of a lower applied voltage, because the period during which ions are influenced by the electrode is longer. Of course, a shorter electrode with a higher voltage will give a cleaner, more abrupt cut off in the ion beam.

With reference again to FIG. 1, a motion encoder 120, which in the simplest case may be a rotary encoder that produces a series of pulses indicative of rotation, driven by movement of the imaging surface 34, directs such pulses to a counter 122, which upon detection of a predetermined number of pulses indicative of movement by an increment of one line width of print, produces a signal $V_E(t)$, indicative of movement of the charge receptor to a new position. $V_E(t)$ is directed to a writing controller 124, a pulse shaping circuit which produces a signal $V_G(t)$ having an ON period of $\alpha$ duration along line 128, to gating electrode 100 that allows passage of the stream of ions therepast. Period $\alpha$ is set at writing control 124 by machine controller 150, which also processes image input data and directs the modulation switching control to switch 38, as well as control other machine functions. Encoder 120 may also deliver a motion controlling signal to machine controller 150, to control the timing of modulation at switch 38. Of course, a variety of motion encoding arrangements is available, including optical arrangements which detect passage of indicia imprinted on a surface of the charge receptor therepast. Other arrangements for detecting a predetermined amount of movement and producing a signal indicative thereof are not precluded by this disclosure.

Figure 3:
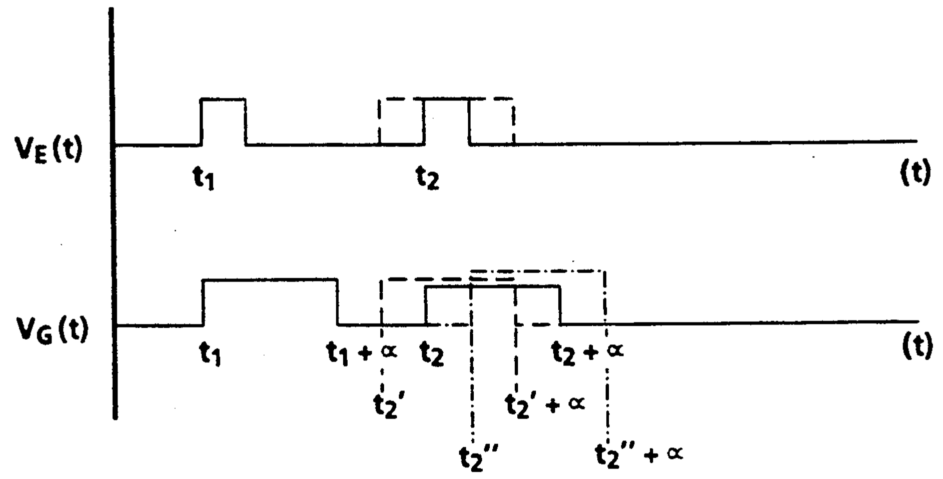
FIG. 3 shows one possible wave form of $V_G$ suitable for use with the present invention.

FIG. 3 illustrates a control sequence of the inventive arrangement. Upon detection of a high or ON signal in $V_E(t)$ from counter 122 indicating an incremental movement of charge receptor 34, writing control 124 produces an ON signal in $V_G(t)$ having a predetermined magnitude and duration. Duration or period $\alpha$ is predetermined by the maximum amount of charge deposited on the charge receptor over time, and accordingly is set, based on efficiency of the head in the production of ions, desired charge density for printing, and of course, by the desired machine printing speed. Period $\alpha$ is constant, commencing at or near the time $t_n$, when $V_E(t)$ goes high, although the time between successive periods varies with changes in the charge receptor motion. $V_G(t)$ has a magnitude between approximately $V_H$ and a sufficiently large positive or negative voltage, selected to positively block or allow passage of the ion stream therepast.

In operation, as encoder 120 produces signals indicative of movement, passage of ions into modulation channel 24 is controlled by gating electrode 100. When encoder 120 detects movement by an increment of a line, gating electrode 100 is driven to a voltage level which allows passage of ions therepast for a period $\alpha$. After period $\alpha$, during which a desired amount of charge is deposited on charge receptor 34, gating electrode 100 is driven to a second voltage which produces a field at modulation channel 24 blocking movement of ions therepast. Accordingly, even if charge receptor 34 has not moved with respect to ion head 10, only a predetermined amount of charge has been delivered thereto.

Of course, the described arrangement is only one method of deriving a signal $V_G$ suitable to drive the gating electrode. In another embodiment, the gating electrode may be connected to a voltage source via a switch, and the switch controlled by the signal from the writing control.

Interestingly, in the embodiment described, the effect of the combination of the gating electrode and the modulation electrode is a logical NOR gate, that allows current to flow only when both the gating electrode and the modulation electrode will allow passage of the ion stream therepast. A logical extension of the invention is therefore to use the arrangement to multiplex the nibs in place of the usual TFT transistor arrangement described. Accordingly, if the gating electrode is segmented into a plurality of segments, each segment addressable with a driving voltage over the space of a line width, data may be directed to the modulation nibs in parallel, since ion flow will not occur in accordance with nib modulation unless the gating electrode is also in a condition allowing ion flow. Thus, as illustrated in the highly schematic showing of FIG. 4, ions from corotron wire 14 must pass both the gating electrodes 100 *a–e*, which are sequentially turned on and off, and the modulation electrodes, driven in groups corresponding in size to the gating electrodes with the imaging information. Thus, imaging information for group I is directed to all the nibs in the array, but only the group I imaging information is printed if only gating electrode 100*d* is turned on. Of course, feedback arrangements applying a variable ON voltage to the gate electrodes may be put into place to correct for localized time dependent variations in corotron output current. Since analog feedback is functionally independent from the previously described gating arrangement, the two actions may be combined advantageously to correct for motion quality variations.

In accordance with FIG. 5A, the same gating control concept may be modified with a feedback scheme to regulate the head output current. In FIG. 5A, an arrangement generally similar to that of FIG. 2 is shown,, with the addition of an output current sampling electrode 200, supported on surface 50 and insulated therefrom with insulator 202, slightly downstream from gating electrode 100. Sampling electrode 200 is provided with a voltage source 204, which provides a voltage $V_{sample}$, applied to electrode 200 for a period $t_s$ via switch 210, and having a magnitude sufficient to draw most or all of the ion current directed through modulation channel 24 to sampling electrode 200. Switch 210 connects $V_{sample}$ to electrode 200 in accordance with encoder signal $V_E$ (see FIG. 5B) when a new writing position has been reached. $V_{sample}$ is activated during a portion of the time $V_G$ is "on" and has a pulse duration of perhaps 10% of the $V_G$ period (see FIG. 5B). The current collected by modulation electrode 200 is measured with a current detector 206, with the signal integrated over a selected period at capacitor 208. The output of current detector 206 is directed to writing control 124 which can adjust the magnitude of $V_G$, to regulate ion flow through channel 24.

The invention has been described with reference to a preferred embodiment. Obviously modifications will occur to others upon reading and understanding the specification taken together with the drawings. Various alternatives, modifications, variations or improvements may be made by those skilled in the art from this teaching which are intended to be encompassed by the following claims.

I claim:

1. In an ionographic imaging device, including a source of ions, means for moving ions in a stream towards a moving imaging surface to create a pattern of charge thereon, modulation means to modulate the stream of ions in imagewise fashion to form intelligible charge patterns on the imaging surface, and means for controlling an amount of charge deposited at any given position on the imaging surface, independent of movement of the imaging surface, comprising:

means for detecting incremental motion of the imaging surface, and producing a signal indicative thereof;

a gating electrode supported adjacent a path of the stream of ions;

a voltage source, connected to said gating electrode, and operating between two conditions to drive said gating electrode to produce either a field allowing passage of the stream of ions past the gating electrode, or a field blocking passage of the stream of ions past the gating electrode by varying a magnitude of the field;

means for controlling said voltage source responsive to said incremental motion detecting means, to produce a field allowing passage of the stream of ions past said gating electrode for a predetermined time after receipt of said signal;

current sensing means, supported adjacent the path of the stream of ions, downstream from said gating electrode, for sensing an amount of ion flow;

feedback means for altering operation of said voltage source controlling means, in accordance with the amount of ion flow past said current sensing means.

2. The device as defined in claim 1, wherein said current sensing means includes a current sensing electrode, periodically biased to a measurement voltage which causes substantially all the ions to flow to said current sensing electrode, and a current detector, for sensing current through said current sensing electrode.

3. The device as defined in claim 2, wherein said current sensing electrode is biased to said measurement voltage at a commencement of said predetermined time for a period relatively short with respect to said predetermined time.

4. The device as defined in claim 1 wherein said feedback means alters operation of said voltage source controlling means to vary the magnitude of said field at said gating electrode.

5. The device as defined in claim 1 wherein said feedback means alters operation of said voltage source controlling means to vary said predetermined time of production of the field allowing passage of the stream of ions past the gating electrode.

* * * * *